United States Patent [19]

Shiraishi

[11] Patent Number: 4,650,026
[45] Date of Patent: Mar. 17, 1987

[54] OFFROAD RUNNING MOTORCYCLE

[75] Inventor: Nobuaki Shiraishi, Iwata, Japan

[73] Assignee: Yamaha Hatsudoki Kabushiki Kaisha, Iwata, Japan

[21] Appl. No.: 841,060

[22] Filed: Mar. 18, 1986

Related U.S. Application Data

[63] Continuation of Ser. No. 632,717, Jul. 20, 1984, abandoned.

[30] Foreign Application Priority Data

| Jul. 21, 1983 | [JP] | Japan | 58-131853 |
| Jul. 26, 1983 | [JP] | Japan | 58-135120 |
| Jul. 28, 1983 | [JP] | Japan | 58-136827 |

[51] Int. Cl.⁴ .......................................... B62D 61/02
[52] U.S. Cl. .................... 180/227; 180/230; 180/231
[58] Field of Search ............ 180/219, 227, 230, 231

[56] References Cited

U.S. PATENT DOCUMENTS

| Re. 26,608 | 6/1969 | Hopkins | 180/227 X |
| 2,230,749 | 2/1941 | Hebert | 180/219 |
| 3,437,162 | 4/1969 | Diehl | 180/227 X |
| 3,517,764 | 6/1970 | Wendt | 180/227 |
| 3,819,002 | 6/1974 | Heathwaite | 180/227 |
| 4,299,582 | 11/1981 | Leitner | 180/227 X |
| 4,363,375 | 12/1982 | Kauniya | 180/227 |
| 4,392,536 | 7/1983 | Iwai | 180/227 X |
| 4,433,747 | 2/1984 | Offenstadt | 180/231 X |
| 4,445,585 | 5/1984 | Iumani | 180/227 X |
| 4,505,492 | 3/1985 | Tsunoda | 180/227 X |

FOREIGN PATENT DOCUMENTS

| 1037946 | 5/1953 | France | 180/227 |
| 413744 | 5/1946 | Italy | 180/227 |
| 138757 | 2/1920 | United Kingdom | 180/219 |
| 209127 | 12/1923 | United Kingdom | 180/219 |
| 2102749 | 2/1983 | United Kingdom | 180/227 |

*Primary Examiner*—Harold W. Weakley
*Attorney, Agent, or Firm*—Ernest A. Beutler

[57] ABSTRACT

An off the road motorcycle of the type having a rear wheel mounting a balloon type tire and an improved suspension and driving arrangement therefor. The driving arrangement includes a first chain that is disposed on one side of the longitudinal center line of the motorcycle and which is driven by its engine and a second chain disposed on the opposite side of the motorcycle and driving the rear wheels. The chains are interconnected by an intermediate shaft that is journaled on the trailing arm and positioned rearwardly of the trailing arm pivot axis. A single substantially horizontally disposed suspension element cushions the trailing arm movement and an improved arrangement is provided for maintaining uniform tension in the first chain.

10 Claims, 5 Drawing Figures

OFFROAD RUNNING MOTORCYCLE

This application is a continuation of application Ser. No. 632,717, filed July 20, 1984, now abandoned.

BACKGROUND OF THE INVENTION

This invention relates to an offroad running motorcycle and more particularly to an improved drive and suspension arrangement for such a vehicle.

Recently, it has been proposed to employ large low pressure balloon type tires on at least the driving wheel of motorcycles intended for off the road application. Although the low pressure balloon tire provides some suspension in and of itself, for improved ride and handling, it is desirable to incorporate an additional suspension system for the rear wheel. Such vehicles normally employ chain drives for driving the rear wheel and the use of balloon tires gives rise to certain problems in connection with the chain drive. That is, because the tire is as wide or wider than the frame of the motorcycle, the driving sprocket for it must be positioned at the side of the tire as must the driving chain. If a single chain is used from the engine to the rear wheel, this means that the driving sprocket from the transmission or engine must be placed laterally outwardly of the frame. This encroaches in the area where the rider's feet normally are and can give rise to an uncomfortable riding position.

In order to avoid the use of such laterally displaced driving chains in the area of the engine, it has been proposed to use a two chain drive wherein the engine drives a first chain which drives an idler shaft, which idler shaft in turn drives the rear wheel. In this way, the first chain may be placed narrowly within the confines of the motorcycle frame and the rider's seating and foot position will not be adversely affected. An example of such an arrangement is shown in Japanese Published Application No. 49-27375, published July 25, 1974.

However, the disadvantages of the construction shown in that patent is that the intermediate driving chain from the engine to the intermediate shaft is placed directly behind the final driving chain which makes servicing of the intermediate chain difficult, if not impossible, without removal of the final driving chain.

It is, therefore, a principal object of this invention to provide an improved driving chain arrangement for a motorcycle of the type embodying a balloon tire.

It is another object of the invention to provide an improved multiple driving chain arrangement for a motorcycle or the like wherein the individual chains may be conveniently serviced without removing other chains.

In connection with motorcycles having suspended rear wheels, including those of the balloon tire type, it is the normal practice to use a trailing arm suspension for the rear wheel. With off the road vehicles, it is particularly important to use a relatively long trailing arm construction so as to employ large suspension movements due to the wide variety of terrains over which the vehicle is operated. Where a dual chain drive is employed, however, it has been difficult to employ such long trailing arms due to the difficulty in mounting the chains in such a way that their tension will not change during suspension movement and in order to avoid wear of the chains. One way this can be done is by placing the intermediate shaft in line with the pivot shaft of the trailing arm as shown in the noted Japanese published application. One disadvantage of such an arrangement is that the intermediate driving chain is quite short in length and it is difficult to have its tension adjusted. Also, this arrangement tends to reduce the permissible length of the trailing arm suspension.

It is, therefore, a further object of this invention to provide an improved driving arrangement for a motorcycle or the like having a trailing arm suspension.

It is another object of this invention to provide a chain driving arrangement for the wheel of a vehicle supported by a trailing arm in which multiple chains are employed and the configuration is such that the tensioning of the chains does not vary during suspension movement.

As has been noted, the combination of a balloon tire and a suspension system has particularly utility in improving the handling of off the road motorcycles. However, due to the use of the extremely wide rear tires, it has been difficult with prior art constructions to locate the suspension elements in such a manner that they do not encroach upon and adversely affect the seating position.

It is, therefore, a still further object of this invention to provide an improved suspension arrangement for a motorcycle or the like.

It is a further object of this invention to provide an improved motorcycle suspension wherein a single centrally positioned suspension unit can be utilized with a wide balloon tire.

SUMMARY OF THE INVENTION

A first feature of this invention is adapted to be embodied in an off the road vehicle having frame means and at least one front wheel dirigibly supported by the frame means. Trailing arm means are supported for pivotal movement relative to the frame means about a first pivot axis and a wheel is rotatably supported by the trailing arm means about a second axis that is offset rearwardly from the first axis. An engine is supported on the frame means and drives an output shaft that extends transversely relatively to the motorcycle and parallel to the first and second axes. A driving arrangement is provided for driving the rear wheel from the output shaft which includes an idler shaft. A first chain drives the idler shaft from the engine output shaft and is positioned on one side of the longitudinal center line of the frame means. A second chain drives the rear wheel from the idler shaft and is disposed on the opposite side of the longitudinal plane from the first chain.

Another feature of the invention is adapted to be embodied in an off the road vehicle having frame means and at least front wheel dirigibly supported by the frame means. Trailing arm means are pivotally supported about a first pivot axis on the frame means and support a rear wheel for rotation about a second axis that is disposed rearwardly of the first axis. An engine is supported by the frame means and drives an output shaft that extends transversely of the vehicle and which is disposed forwardly of the first pivot axis. An idler shaft is journaled on the trailing arm means for rotation about a third axis that is disposed between the first and second axes. Chain drive means are incorporated for driving the idler shaft from the output shaft and for driving the rear wheel from the idler shaft.

Another feature of the invention is also adapted to be embodied in a motorcycle or the like having a frame means and a dirigibly supported front wheel. Trailing arm means are supported for pivotal movement relative to the frame means about a first pivot axis and rotatably support a rear wheel about a second axis that is offset rearwardly from the first axis. An engine is supported by the frame means and drives an output shaft that extends transversely relative to the motorcycle and parallel to the first and second axes. In accordance with this feature of the invention, chain drive means are provided for driving the rear wheel from the output shaft that includes a driven sprocket that is journaled on the trailing arm at a point spaced rearwardly from the first pivot axis and a chain trained around said driven sprocket and a driving sprocket that is affixed to the output shaft. Roller means are journaled for rotation about the first axis and are engaged with opposite flights of the chain for maintaining the tension thereof upon pivotal movement of the trailing arm.

A still further feature of the invention is adapted to be embodied in a suspension for a motorcycle having a frame means and a front wheel that is dirigibly supported by the frame means. In accordance with this feature of the invention, trailing arm means are supported for pivotal movement relative to the frame and carry a balloon tired rear wheel that has a width at least as great as that of the frame. The trailing arm is operatively connected to a single suspension element for cushioning its pivotal movement, which suspension element is positioned on the longitudinal center line of the frame means.

DETAILED DESCRIPTION OF THE PREFERRED EMBODIMENT

Figure 1:
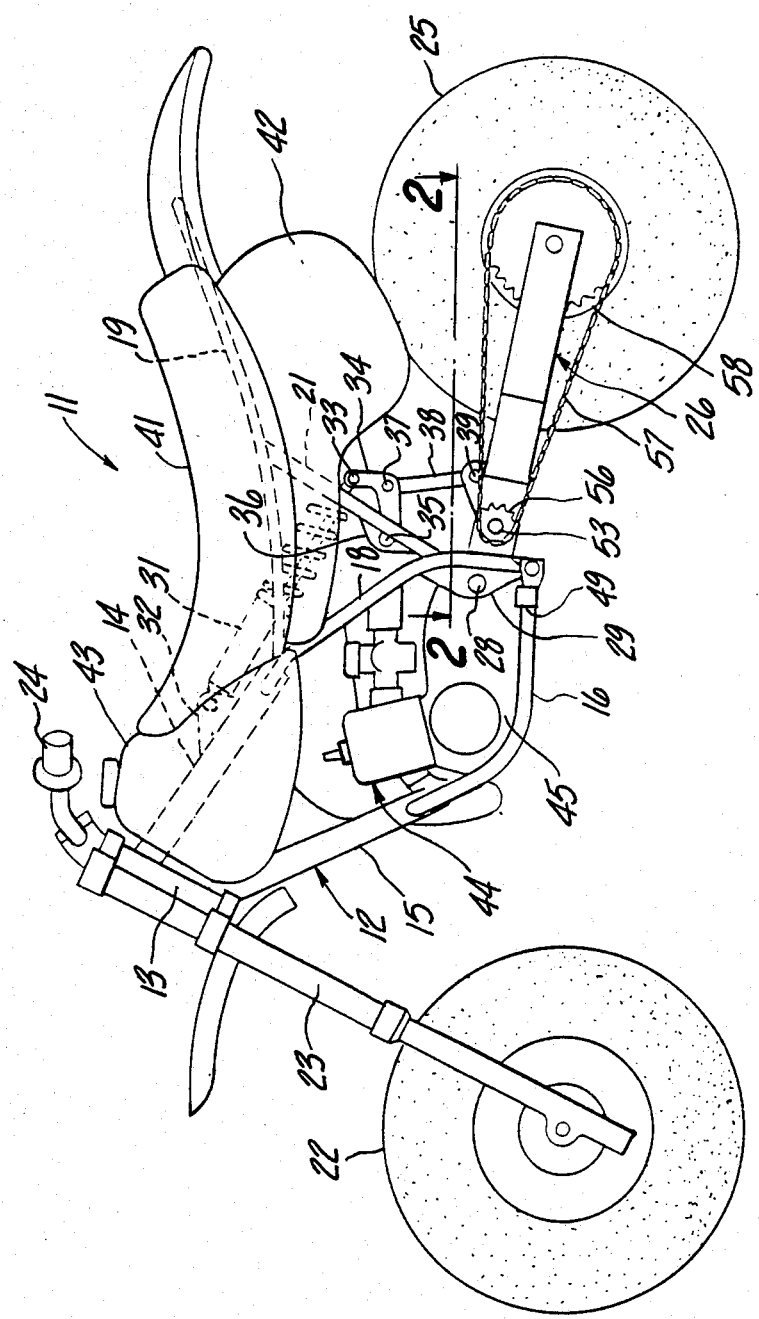
FIG. 1 is a side elevational view of an off the road motorcycle constructed in accordance with an embodiment of the invention.

An off the road motorcycle constructed in accordance with an embodiment of the invention is identified generally by the reference numeral 11. The motorcycle 11 includes a frame assembly, indicated generally by the reference numeral 12 and made of a welded assembly of pipes and tubes. The frame 12 includes a head pipe 13 from which a main tube 14 extends in a rearward and generally downward direction. A down pipe 15 also extends from the head pipe 13 in a downwardly and rearward direction and is positioned generally beneath the main tube 14 and on the longitudinal center line of the motorcycle 11. A pair of lower tubes 16 extend outwardly from the lower end of the down tube 15 and rearwardly on opposite sides of the motorcycle 11. The rear ends of these lower tubes 16 are affixed to a pair of seat pillar tubes 18 which extend in a generally upward direction and then curve forwardly to be joined to the main tube 14 near its rear end. A generally U shaped seat rail 19 extends rearwardly from the seat pillar tubes 18 and is supported intermediate its ends by back tubes 21 that extend downwardly to the bight of the seat pillar tubes 18.

A low pressure, balloon tired front wheel 22 is journaled at the lower end of a front fork assembly 23. The fork assembly 23 is, in turn, journaled for steering movement of the front wheel 22 relative to the head pipe 13 in a known manner. A handlebar assembly 24 is connected to the upper end of the fork assembly 23 for facilitating steering. If desired, the fork assembly 23 may include a suspension system for the front wheel 22.

A low pressure, balloon tired rear wheel 25 is supported at the rear of the frame assembly 12 by means including a trailing arm assembly, indicated generally by the reference numeral 26. The balloon tired rear wheel 25 is, as may be readily apparent from FIGS. 2 and 3, at least as wide as the widest portion of the frame 12 and may, in fact, be wider than the frame. The trailing arm assembly 26 includes a pair of arm members 27, each of which is disposed on opposite sides of the longitudinal center line of the motorcycle 11, which center line is identified by the reference character C in FIG. 2. The arms 27 are offset at their rearward end as clearly seen in this figure so as to clear the balloon tired rear wheel 25. The forward ends of the arms 26 are offset inwardly toward the center line C and are pivotally supported at their forward ends about a pivot axis defined by a pivot pin 28. The pivot pin 28 is carried by a pair of brackets 29 that are welded to the frame assembly and specifically to the area in the juncture between the rear ends of the lower tubes 16 and the lower ends of the seat pillar tubes 18. The shape of the arms 27 gives the trailing arm assembly 26 a Y shape in top plan.

A suspension arrangement is provided for controlling the pivotal movement of the trailing arm assembly 26 and the movement of the balloon tired rear wheel 25 relative to the frame assembly 12. This suspension system includes a single combined shock absorber coil spring assembly 31 that is disposed on the longitudinal center line C of the motorcycle 11. The suspension element 31 has its forward end pivotally connected to a bracket 32 carried on the upper side of the main frame tube 14. The suspension element 31 extends in a generally horizontal direction and has its rear end pivotally connected by means of a pivot pin 33 to one arm of an L shaped link assembly 34. An opposite arm of the link assembly 34 is pivotally connected by a pivot pin 35 to brackets 36 that are affixed to the back tubes 21. An intermediate arm of the link assembly 34 is connected by a pivot pin 37 to a short connecting link 38. The lower end of the connecting link 38 is pivotally connected by means of a pivot pin 39 to the trailing arms 27 at the point where they extend close to the center line C of the motorcycle 11 as is clearly shown in FIG. 2. It should be readily apparent that pivotal movement of the trailing arm assembly 26 effects loading of the suspension element 31 through the described linkage system.

A seat 41 is carried by the seat rails 19 and overlies the suspension element 31. A pair of protective skirts 42 depend from the seat 41 and extend on opposite sides of the balloon tired rear wheel 25. Forwardly of the seat 41, a saddle shaped fuel tank 43 is carried by the frame assembly 12 and also overlies, in part, the suspension element 31 and its forward supporting bracket 32.

An engine, which may be of any known type and which is identified generally by the reference numeral 44, is supported within the frame assembly 12 for powering the rear wheel 25 in a manner to be described. The engine 44 includes an integral crankcase transmission assembly 45 which has a rearwardly extending mounting boss 46 that is supported by the pivot shaft 28 for the trailing arm assembly 26 between the points of pivotal connections to the arm members 27. As has been previously noted, the engine 44 has an integral crankcase transmission assembly 45 in which a change speed transmission may be contained. This change speed transmission includes an arrangement wherein an output shaft 47 may be driven from the power plant of the engine 44 in any of a plurality of speed ratios, which may, if desired, include a reverse. A driving sprocket 48 is affixed to an exposed end of the output shaft 47 on one side of the longitudinal center line C at a relatively narrow distance as indicated by the dimension D. This close spacing permits a pair of foot pegs 49 to be carried by the frame assembly 12 in a suitable location wherein the rider may place his feet without having to straddle a wide final drive.

A first, driving chain 51 is trained around the driving sprocket 47 and an intermediate sprocket 52 that is affixed to an intermediate shaft 53. The intermediate shaft 53 is journaled on a pair of spaced bearings 54 and 55 carried by the arm members 27 of the trailing arm assembly 26. The rotational axis of the intermediate shaft 53 is spaced rearwardly of the pivot axis 28 of the trailing arm assembly 26 and forwardly of the rotational axis of the rear wheel and mounted balloon tire 25.

Figure 2:
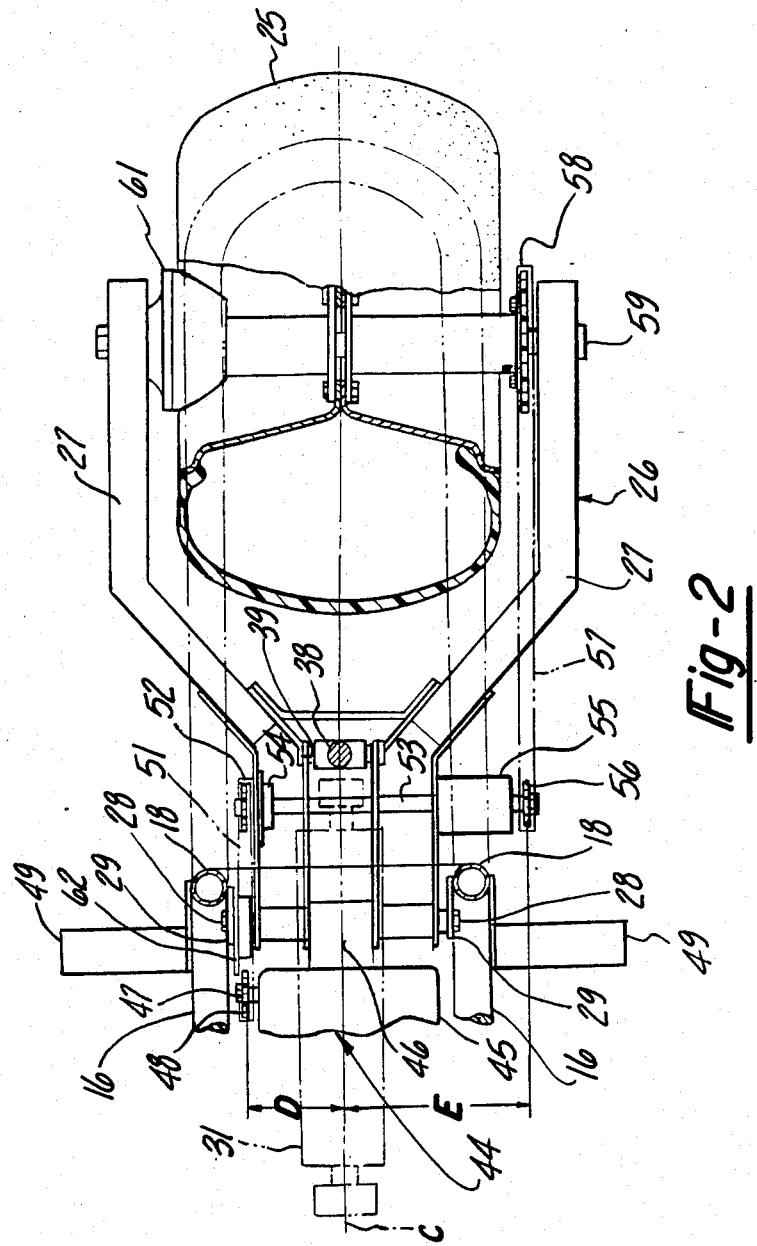
FIG. 2 is a view taken generally in the direction of the line 2—2 of FIG. 1 and shows the suspension and driving arrangement for the rear wheel.

The end of the intermediate shaft 53 opposite to that to which the sprocket 52 is attached carries a further sprocket 56 which is spaced from the center line C a distance E which is substantially greater than the distance D and, in fact, is wider than the width of the frame 12 as may be readily seen from FIG. 2. The distance E is also sufficient so that a second driving chain 57 may be trained around the sprocket 56 and a driven sprocket 58 that is affixed to the rear wheel and balloon tire 25 in an appropriate manner so as to drive this wheel.

Figure 3:
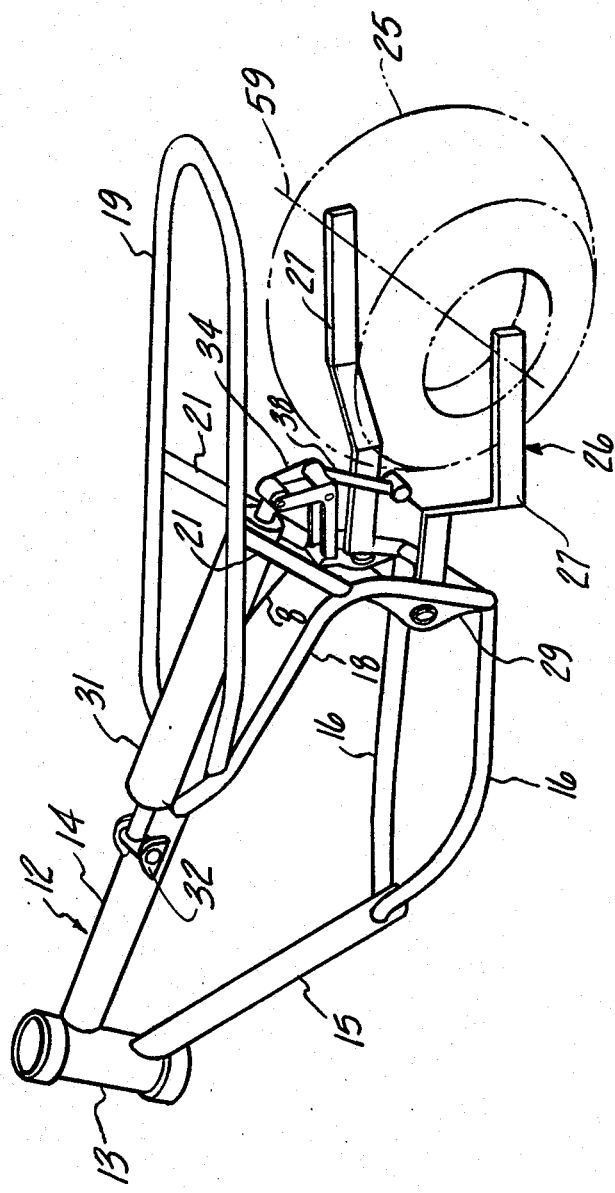
FIG. 3 is a perspective view of the frame and rear wheel suspension system of the motorcycle with the seat and other components removed and the rear wheel shown in phantom.

The rotational axis of the rear wheel 25 is defined by a supporting shaft assembly 59 and this rotational axis is identified by this reference numeral in FIG. 3. A suitable brake assembly 61 is associated with the rear wheel and balloon tire 25 on the side of the axis 59 opposite to the sprocket 58 for braking the rotation of the rear wheel and balloon tire 25 in a known manner.

Figure 4:
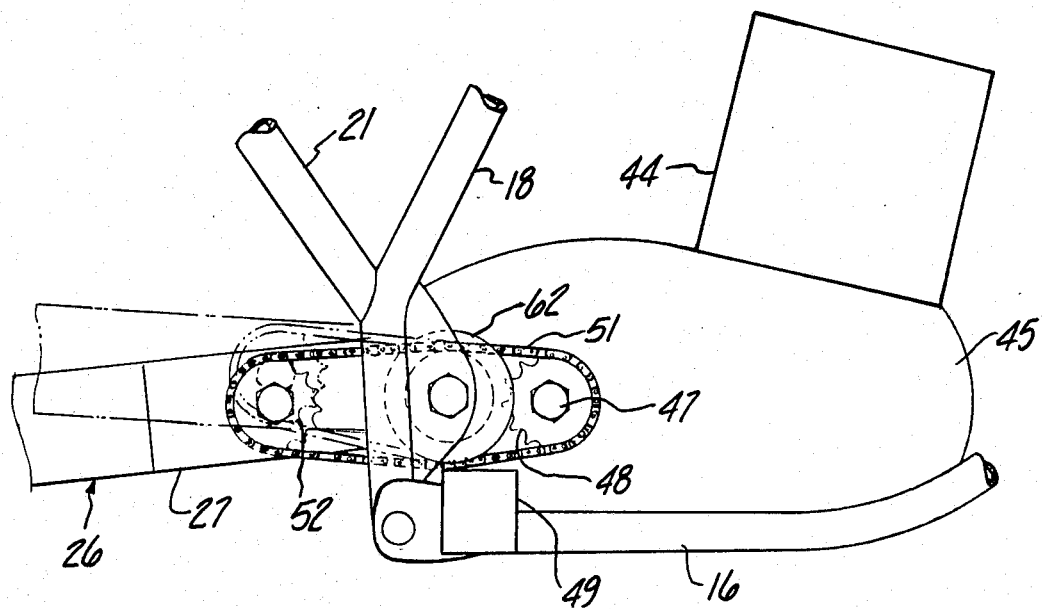
FIG. 4 is an enlarged side elevational view showing a portion of the chain driving mechanism for the rear wheel.
Figure 5:
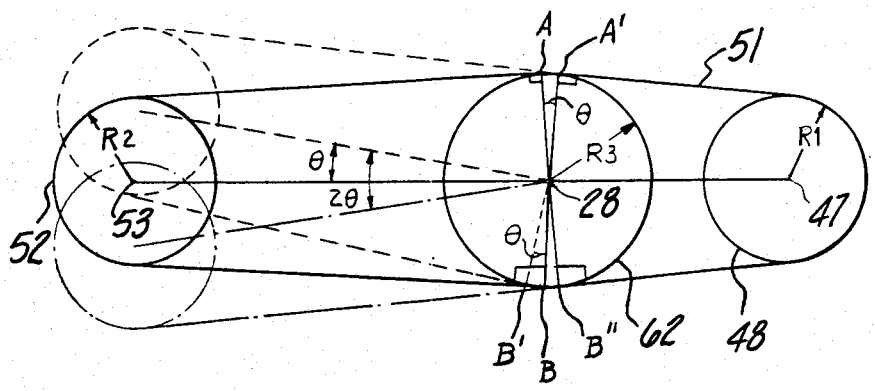
FIG. 5 is an enlarged view of the chain driving mechanism shown in FIG. 4 and illustrates how the tension on the intermediate driving chain is maintained during suspension travel.

As has been previously noted, the use of the two driving chains wherein the first driving chain 51 is positioned relatively close to the center line of the motorcycle 11, permits the placement of the foot pegs 49 in an appropriate position for the rider. However, this is accompanied by a rearward placement of the intermediate shaft 53 relative to the trailing arm pivot axis 28 and can give rise to changes in the chain length during suspension travel which could cause undue wear. However, in accordance with a feature of the invention, an arrangement is provided for maintaining constant tension on the chain 51 during such suspension travel. This mechanism may be best understood by reference to FIGS. 2 and 4 and to FIG. 5 wherein the geometric relationships are illustrated.

Referring now to these figures, a roller or guide assembly 62 is affixed to the pivot shaft 28 on one side of the trailing arm assembly 26 adjacent to the chain 51. As may be seen in FIG. 5, the driving sprocket 47 and driven sprocket 52 have respective radii $R_1$ and $R_2$ which, in the illustrated embodiment, are equal. The intermediate roller 62 has a larger radius $R_3$ and engages the opposite flights of the chain 51 so as to be in contact with them at all times. Hence, as the trailing arm assembly 26 pivots from the normal position as shown in the solid line view of FIG. 5 to the full jounce position as shown in the broken line view and the full rebound position as shown in the dot-dash line view, the axis 53 of the driven sprocket 52 will swing through an angle relative to the pivot axis 28 of the trailing arm assembly indicated by the dimensions $\theta$ and $2\theta$. That is, the full bounce position is at the angle $\theta$ relative to the normal ride position and the full rebound position is at the angle $\theta$ relative to the normal ride position and the angle $2\theta$ relative to the full bounce position.

The radius $R_3$ of the roller 66 and its axial location is chosen reltive to the axes 47 and 53 so that its outer periphery will be engaged by the flights of the chain 51 during the full range of suspension travel. As a result, when the rear wheel and balloon tire 25 moves to the full bounce position as shown in the broken line view, the point of contact of the top flight of the chain 51 with the roller 62 will move from the point A to the point A' through an arc equal to the angle $\theta$. At the same time, the lower flight of the chain 51 will move its point of contact with the roller 62 from the point B to the point B' which is also through the angle $\theta$. In a similar manner, during movement through the full jounce position, the lower flight will move from the point B to the point B'', also equal to the angle $\theta$, and a corresponding movement will occur relative to the point of contact of the top flight of the chain 51 with the roller 62. Hence, the chain length is always maintained constant during full suspension travel and there will be no significant wear resulting from the movement of the chain and the suspension travel. Of course, if desired, a suitable arrangement may be incorporated for adjusting the position of one of the sprockets so as to tension the chain 51. Alternatively, the chain may be tensioned by removing or adding to its number of links. The same types of adjustment may be incorporated with the chain 57.

It should be readily apparent that the described construction permits a very compact assembly for the suspension system and the driving arrangement for a balloon tire of a motorcycle or other similar vehicle. In addition, the dual chain drive is of such a nature that changes in length of the chain and changes of tension during suspension travel are avoided, hence servicing is not a problem. In addition, the placing of the chains on opposite sides of the intermediate shaft permits servicing of one chain without necessitating removal of the other chain or without interference from it.

Although a preferred embodiment of the invention has been illustrated and described, various changes and modifications may be made without departing from the spirit and scope of the invention, as defined by the appended claims.

I claim:

1. A motorcycle or the like having frame means, a front wheel dirigibly supported by said frame means, trailing arm means supported for pivotal movement relative to said frame means about a first pivot axis, a rear wheel rotatably supported by said trailing arm means about a second axis rearwardly displaced from said first axis, an engine supported by said frame means and driving an output shaft extending transversely relative to said motorcycle and parallel to said first and second axes, and chain drive means for driving said rear wheel comprising a drive sprocket fixed to said output shaft, a driven sprocket journaled on said trailing arm at a point spaced rearwardly from said first pivot axis, a chain trained around said driving and driven sprockets for transferring drive therebetween, and a single roller journaled for rotation about said first axis and engaged with opposite flights of said chain for maintaining tension thereof upon pivotal movement of said trailing arm means.

2. A motorcycle or the like as set forth in claim 1 wherein the diameters of the driving and driven sprockets and the single roller and longitudinal placement thereof is such that the length of the driving chain does not change during suspension travel of the trailing arm means and wherein the arc of movement of the trailing arm means relative to the first pivot axis equals the arc of movement of the respective chain flights with the opposite sides of said single roller upon suspension movement.

3. A motorcycle or the like as set forth in claim 2 wherein the chain drive means further includes a second chain trained around a second driving sprocket affixed to the first driven sprocket and a second driven sprocket fixed for rotation with the rear wheel.

4. A motorcycle or the like as set forth in claim 3 wherein the first and second chains are positioned on opposite sides of the longitudinal center line of the motorcycle.

5. A motorcycle or the like as set forth in claim 4 wherein the first chain is disposed substantially closer to the center line than the second chain.

6. A motorcycle or the like as set forth in claim 1 wherein the rear wheel mounts a balloon tire having a width substantially equal to the width of the frame means and further including a single suspension element for controlling the pivotal movement of said trailing arm means relative to said frame means and disposed substantially on the longitudinal center line of said vehicle.

7. A motorcycle or the like having frame means including a pair of members on each side of said frame means connected to each other at a rear end of said frame means by means including a bracket, a front wheel dirigibly supported by said frame means, trailing arm means supported for pivotal movement relative to said frame means about a first pivot axis defined by said brackets, a wheel mounting a balloon tire having a width substantially equal to the width of said frame means and rotatably supported by said trailing arm means about a second axis offset rearwardly from said first axis, a seat carried by said frame means, a pair of foot pegs carried said frame means forwardly of said brackets for supporting the feet of a rider seated upon said seat, an engine supported by said frame means and driving an output shaft extending transversely relative to said motorcycle and parallel to said first and second axes, and chain drive means for driving said rear wheel from said output shaft comprising a first driving sprocket affixed to said output shaft, a first driven sprocket journaled relative to said trailing arm means for rotation about an axis spaced rearwardly from said output shaft and of said foot pegs, a first driving chain encircling said first driving sprocket and said first driven sprocket, a second driving sprocket affixed for rotation with said first driven sprocket and disposed on the opposite side of the longitudinal center line of said motorcycle from said first driven sprocket, a second driven sprocket affixed for rotation with said rear wheel, and a second chain trained around said second driving sprocket and said second driven sprocket for driving said rear wheel, said first chain being disposed substantially closer to the longitudinal center line of said vehicle than said second chain so as to nest between the rider's legs while said second chain is rearwardly disposed relative to the rider's legs.

8. A motorcycle or the like as set forth in claim 7 further including a single suspension element for controlling the pivotal movement of said trailing arm means relative to said frame means and disposed substantially on the longitudinal center line of said vehicle.

9. A motorcycle as set forth in claim 8 wherein the suspension element comprises a combined tubular shock absorber and coil spring and is disposed in a substantially horizontal direction.

10. A motorcycle as set forth in claim 9 further including linkage means for loading said single suspension element upon relative movement of the trailing arm means about the first pivot axis.

* * * * *